US008978352B2

(12) United States Patent
Suciu et al.

(10) Patent No.: US 8,978,352 B2
(45) Date of Patent: *Mar. 17, 2015

(54) APPARATUS AND METHOD FOR OPERATING A GAS TURBINE ENGINE DURING WINDMILLING

(75) Inventors: Gabriel L. Suciu, Glastonbury, CT (US); Brian D. Merry, Andover, CT (US); Christopher M. Dye, San Diego, CA (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 642 days.

This patent is subject to a terminal disclaimer.

(21) Appl. No.: 13/278,342

(22) Filed: Oct. 21, 2011

(65) Prior Publication Data
US 2013/0098059 A1    Apr. 25, 2013

(51) Int. Cl.
*F02C 7/06* (2006.01)
*F02G 3/00* (2006.01)
*F02C 9/16* (2006.01)
F02C 7/32 (2006.01)
F02C 3/107 (2006.01)

(52) U.S. Cl.
CPC ... *F02C 9/16* (2013.01); *F02C 7/32* (2013.01); *F02C 3/107* (2013.01); *F05D 2270/091* (2013.01)
USPC ............. 60/39.08; 60/226.1; 244/58; 477/30; 477/31; 184/6.11

(58) Field of Classification Search
CPC ....... F02C 7/32; F02C 3/107; F05D 2270/091
USPC ........ 60/802, 39.08, 226.1, 262, 792, 39.162, 60/39.163, 783, 268, 779, 773; 184/4, 184/6.11, 6.12, 27.2; 244/58; 477/30, 31
See application file for complete search history.

(56) References Cited

U.S. PATENT DOCUMENTS

| | | | | |
|---|---|---|---|---|
| 4,137,705 | A * | 2/1979 | Andersen et al. | 60/39.08 |
| 4,912,921 | A | 4/1990 | Rice et al. | |
| 4,918,923 | A * | 4/1990 | Woollenweber et al. | 60/597 |
| 5,125,597 | A * | 6/1992 | Coffinberry | 244/118.5 |
| 6,305,156 | B1 * | 10/2001 | Lui | 60/785 |
| 7,377,098 | B2 * | 5/2008 | Walker et al. | 60/39.08 |
| 7,805,947 | B2 | 10/2010 | Moulebhar | |
| 7,833,126 | B2 | 11/2010 | Venter | |
| 7,843,079 | B2 * | 11/2010 | Tseng et al. | 290/45 |
| 7,849,668 | B2 | 12/2010 | Sheridcan | |
| 7,883,438 | B2 | 2/2011 | McCune | |
| 8,063,501 | B2 * | 11/2011 | Finney | 290/52 |
| 8,146,370 | B2 * | 4/2012 | Zeiner et al. | 60/792 |
| 8,522,521 | B2 * | 9/2013 | Dyer | 60/39.08 |

(Continued)

*Primary Examiner* — William H Rodriguez
(74) *Attorney, Agent, or Firm* — Carlson, Gaskey & Olds, P.C.

(57) ABSTRACT

A gas turbine engine according to an exemplary aspect of the present disclosure includes a windmill pump driven by a spool. A first pump driven by said spool with an air-oil cooler is located downstream of the first pump. A second pump is also driven the spool with an air-air precooler located downstream of the second pump. A method of operating a gas turbine engine during a "windmilling" condition includes driving a windmill pump with a spool during a "windmilling " condition. A lubricant is communicated to a geared architecture with the windmill pump. A first pump is driven by the spool and an air-oil cooler is located downstream of the first pump.

16 Claims, 9 Drawing Sheets

(56) References Cited

U.S. PATENT DOCUMENTS

| | | | |
|---|---|---|---|
| 8,602,717 B2* | 12/2013 | Suciu et al. | 415/1 |
| 8,826,893 B2* | 9/2014 | Marsh et al. | 123/563 |
| 2007/0265761 A1* | 11/2007 | Dooley et al. | 701/100 |
| 2008/0047376 A1* | 2/2008 | Venter | 74/15.2 |
| 2010/0023169 A1 | 1/2010 | Delaloye | |
| 2010/0086403 A1* | 4/2010 | McCune | 415/229 |
| 2010/0133813 A1* | 6/2010 | Cote et al. | 290/32 |
| 2010/0212281 A1 | 8/2010 | Sheridan | |
| 2010/0294597 A1 | 11/2010 | Parnin | |
| 2012/0272658 A1* | 11/2012 | Murphy | 60/783 |

\* cited by examiner

APPARATUS AND METHOD FOR OPERATING A GAS TURBINE ENGINE DURING WINDMILLING

BACKGROUND

The present disclosure relates to a gas turbine engine, and more particularly to engine operations during "windmilling" conditions.

In the highly unlikely event of an in-flight engine shutdown, a gas turbine engine fan has a tendency to spin at above-idle speed as air is forced through the fan due to forward aircraft motion. This unpowered fan rotation is commonly known as "windmilling". Even a fan of a shut down engine on the ground may "windmill" and may require at least some lubrication sufficient to sustain gears, bearings, seals, and other lubricated components.

SUMMARY

A gas turbine engine according to an exemplary aspect of the present disclosure includes at least one component geared to a spool to control a speed of the spool during a "windmilling" condition.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
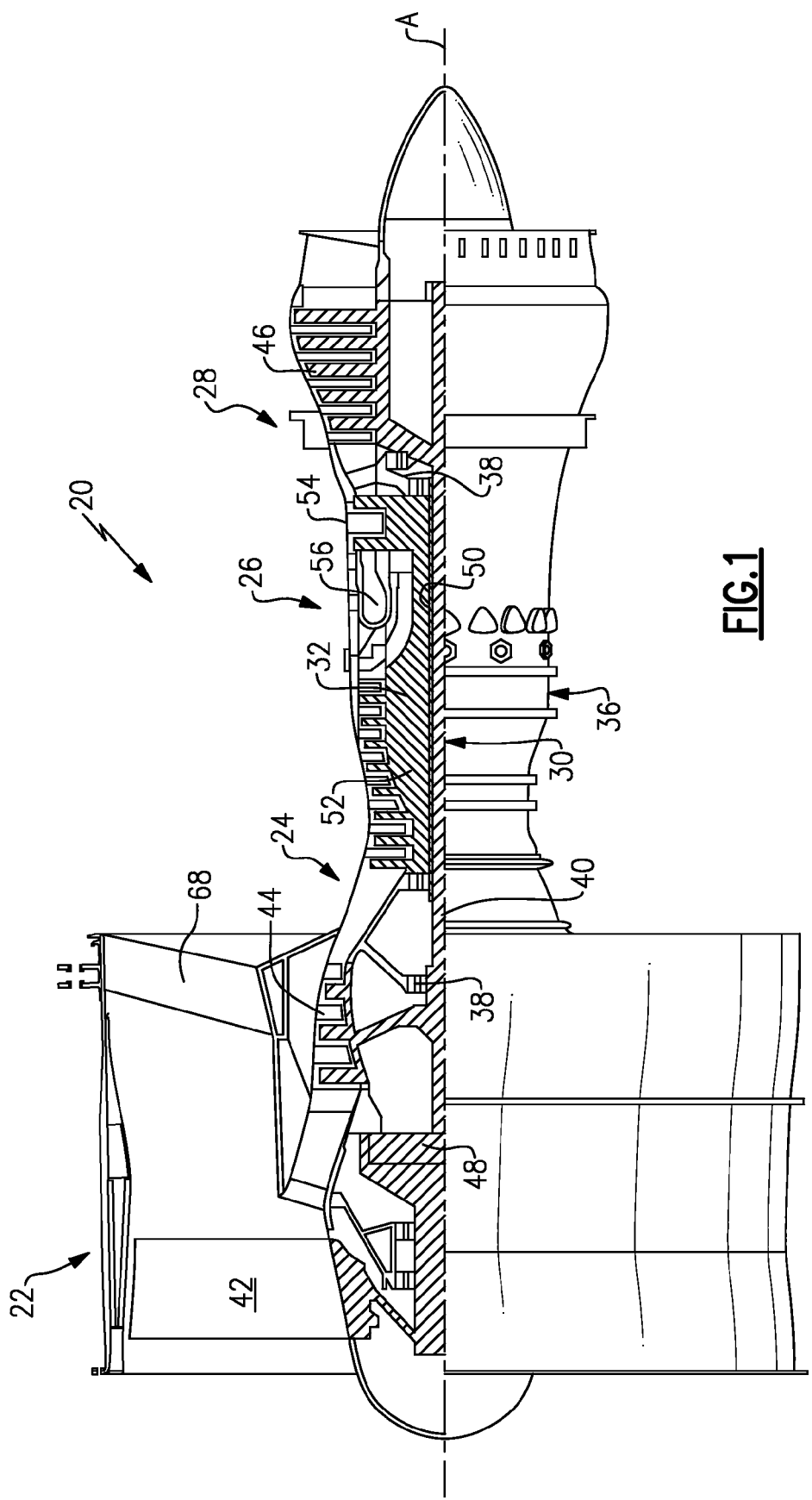
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, such as three-spool architectures.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44 and a low pressure turbine 46. The inner shaft 40 may be connected to the fan 42 directly or through a geared architecture 48 to drive the fan 42 at a lower speed than the low spool 30 which in one disclosed non-limiting embodiment includes a gear reduction ratio of greater than 2.4:1. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low spool 30 and high spool 32 in response to the expansion.

Figure 2:
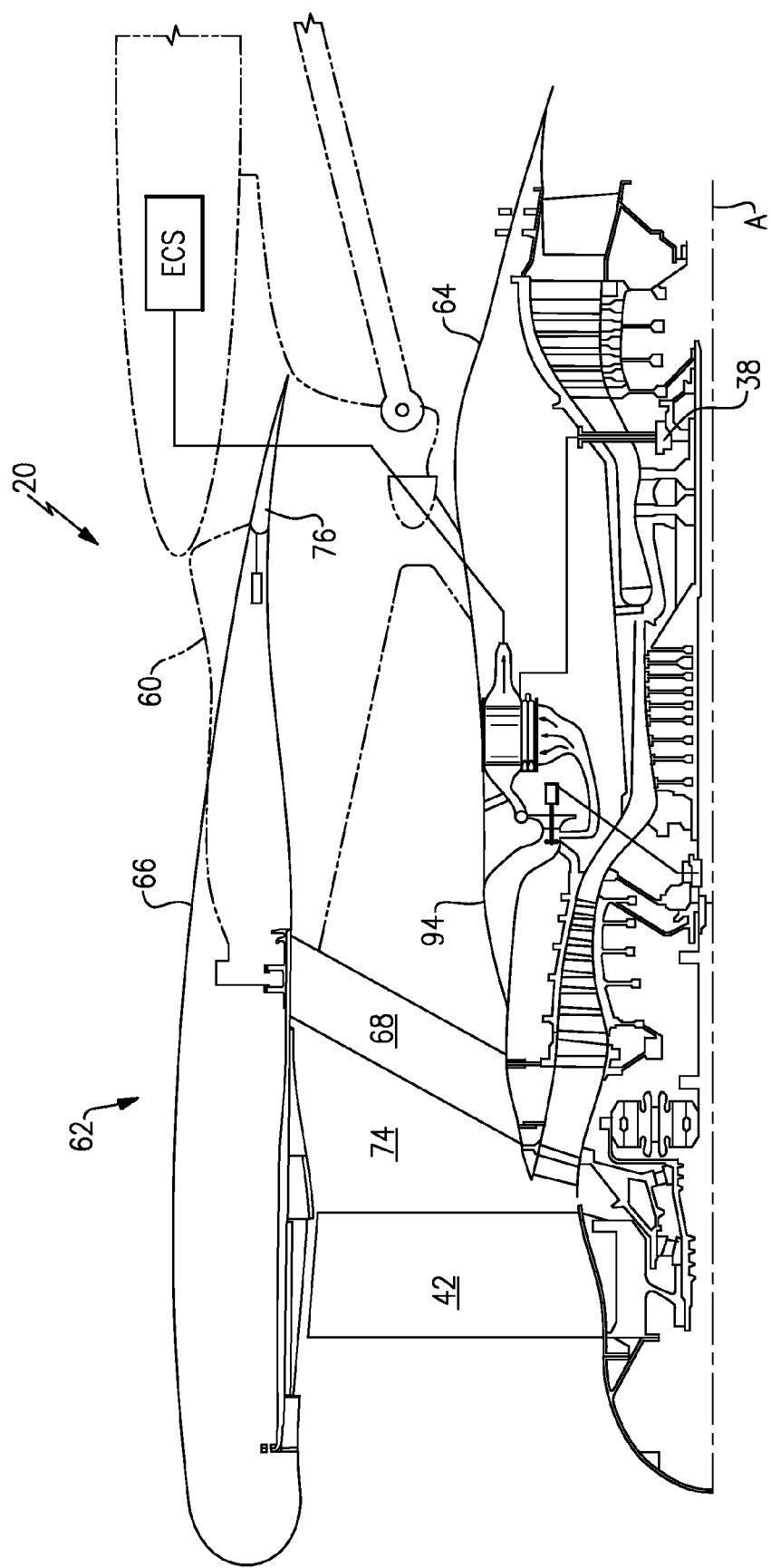
FIG. 2 is a schematic cross-sectional view of the gas turbine engine within a nacelle assembly.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. It should be appreciated that the core nacelle 64 and the fan nacelle 66 may be of various configuration and may be at least partially integrated adjacent to, for example, an upper bi-fi and a lower bi-fi to define what are often referred to as D-doors.

The fan nacelle 66 is at least partially supported relative to the core nacelle 64 by Fan Exit Guide Vanes (FEGVs) 68 which extend between a core case 70 and a fan case 72. The core case 70 and the fan case 72 are structural members that support the respective fan nacelle 66 and core nacelle 64 which define outer aerodynamic surfaces around the core case 70 and the fan case 72. The core case 70 is often referred to as the engine backbone and supports the rotational componentry therein. It should be understood that although a particular component arrangement is disclosed in the illustrated embodiment, various pylon structures, nacelle assemblies and engine case structures will benefit herefrom.

An annular bypass flowpath 74 is defined between the fan nacelle 66 and the core nacelle 64. The engine 20 generates a high bypass flow arrangement with a bypass ratio in which approximately eighty percent of the airflow which enters the fan nacelle 66 becomes bypass flow. In the disclosed non-limiting embodiment, the bypass flow communicates through the generally annular bypass flowpath 74 and may be discharged from the engine 10 through a variable area fan nozzle (VAFN) 76 which defines a variable exit area for the bypass flow.

As the fan blades within the fan section 22 are efficiently designed at a particular fixed stagger angle for an efficient cruise condition, the VAFN 76 is operated to effectively vary the fan nozzle exit area to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 3:
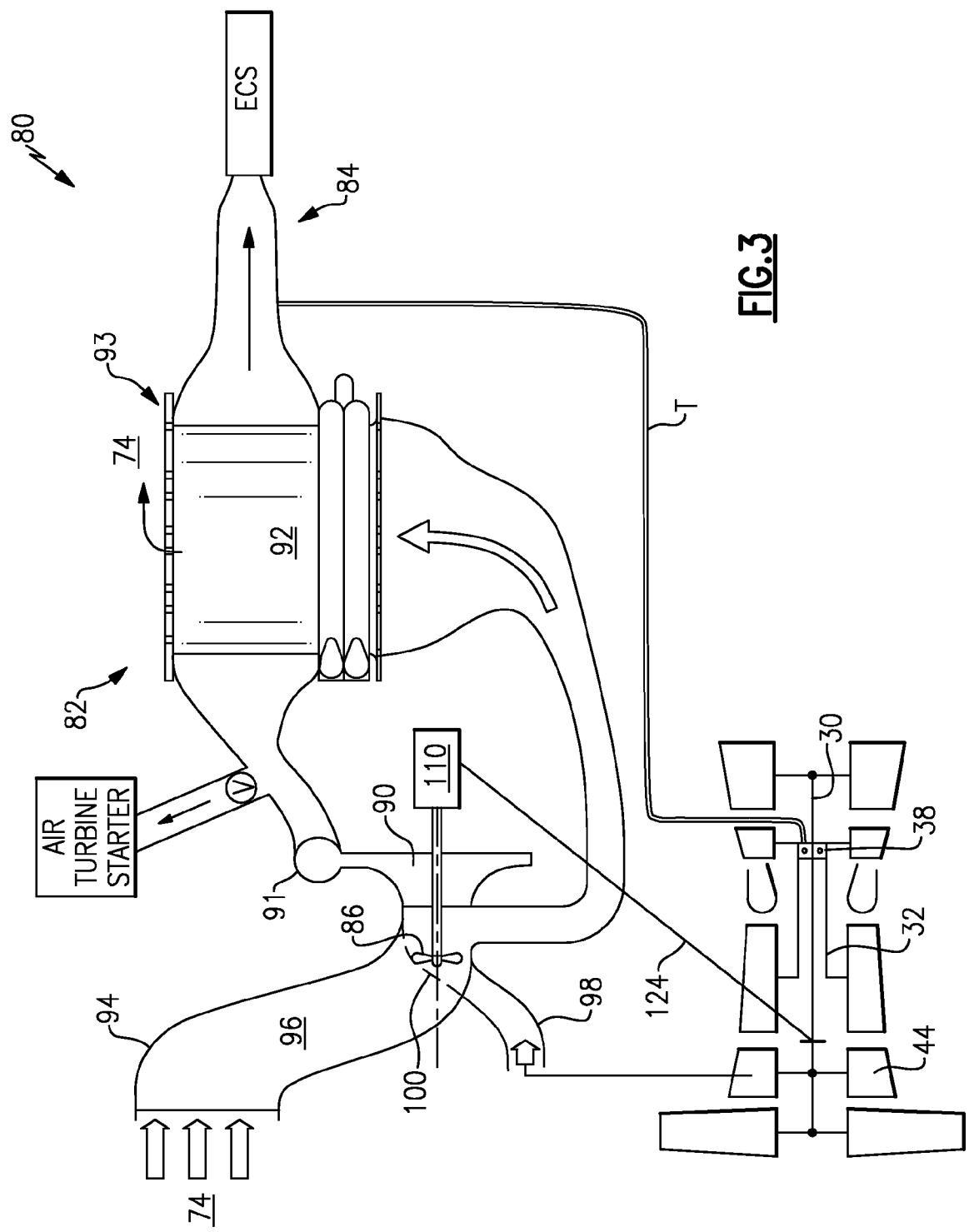
FIG. 3 is an enlarged schematic view of a thermal system with an integrated Thermal Management System (TMS) and Environmental Control System (ECS) for the gas turbine engine.

With reference to FIG. 3, the engine 20 includes a thermal system 80 (illustrated schematically) powered by the low spool 30. The thermal system 80 integrates a Thermal Management System (TMS) 82 and an Environmental Control System (ECS) 84 powered by the low spool 30.

The TMS 82 generally includes a TMS pump 86 such as an axial fan and an air-oil cooler (AOC) 88 which is in fluid communication with an engine lubrication system to cool engine oil. The ECS 84 generally includes an ECS pump 90 such as an impeller within a scroll discharge 91 and an air-air precooler 92 which operates to cool air for use in the aircraft cabin. The flow passes through the air-oil cooler (AOC) 88 to cool engine oil then through the air-air precooler 92 to cool the relatively hot ECS air.

Figure 4:
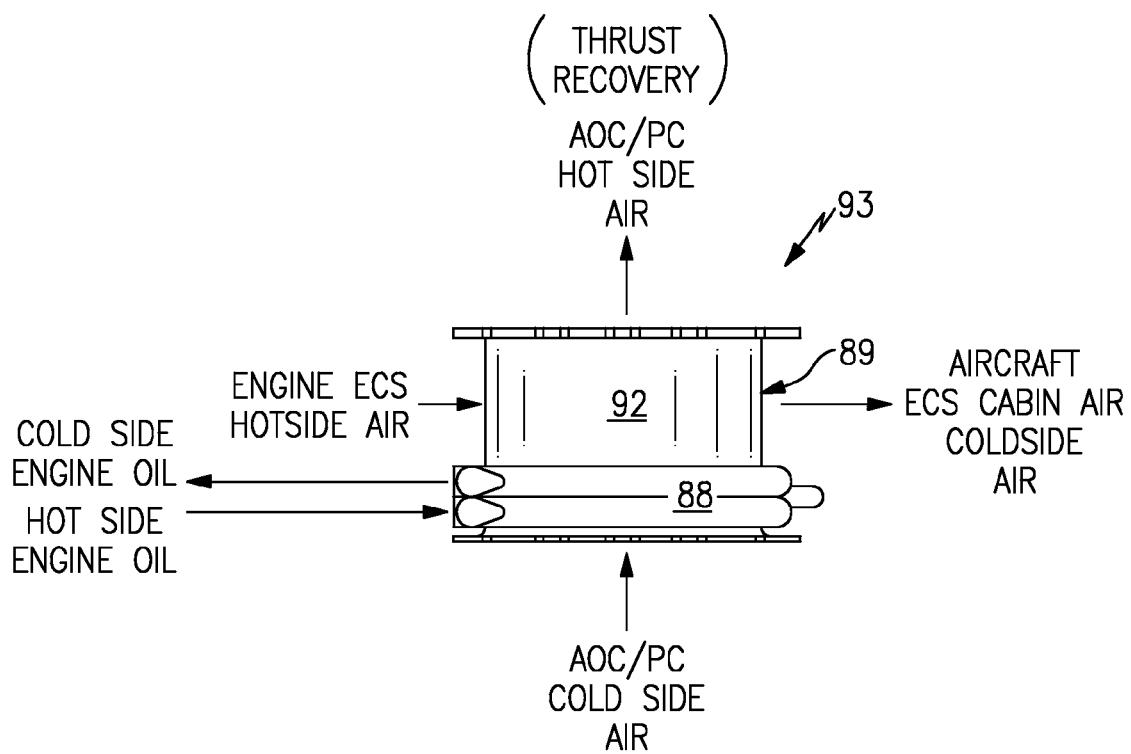
FIG. 4 is a schematic view of an integrated air-oil cooler (AOC)/air-air precooler.

In one disclosed, non-limiting embodiment, the coolers 88, 92 are integrated into one unit 93 to reduce system weight, size, and complexity. It should be appreciated that two or more coolers may be so integrated such that a cooling air flow passes through the air-oil cooler (AOC) 88 and then directly into air-air precooler 92. Arrangement of the air-oil cooler (AOC) 88 and the air-air precooler 92 in direct series as a single unit within a common housing 89 (FIG. 4) provides for a reduction in the overall packaging volume with reduced weight due in part to elimination of separate inlet and exit duct geometries. The sandwich structure also eliminates transition duct length associated with separate coolers and connecting flanges, as well as locates the fin media closer together to further reduce package volume.

For volume-challenged engine architectures, the decreased packaging volume trades favorably against a relatively small weight increase as the air-air precooler 92 may be sized somewhat larger than otherwise required to match a rectilinear shape and flow path geometry of the air-oil cooler (AOC) 88. That is, the geometry of the integral unit may result in one of the air-air precooler 92 or the air-oil cooler (AOC) 88 to be physically oversized. Such an "oversized" relationship advantageous provides overly efficient operation and may somewhat increase weight—yet still less than separate coolers—as a tradeoff for elimination of separate inlet and exit duct geometries of separate coolers.

Figure 5:
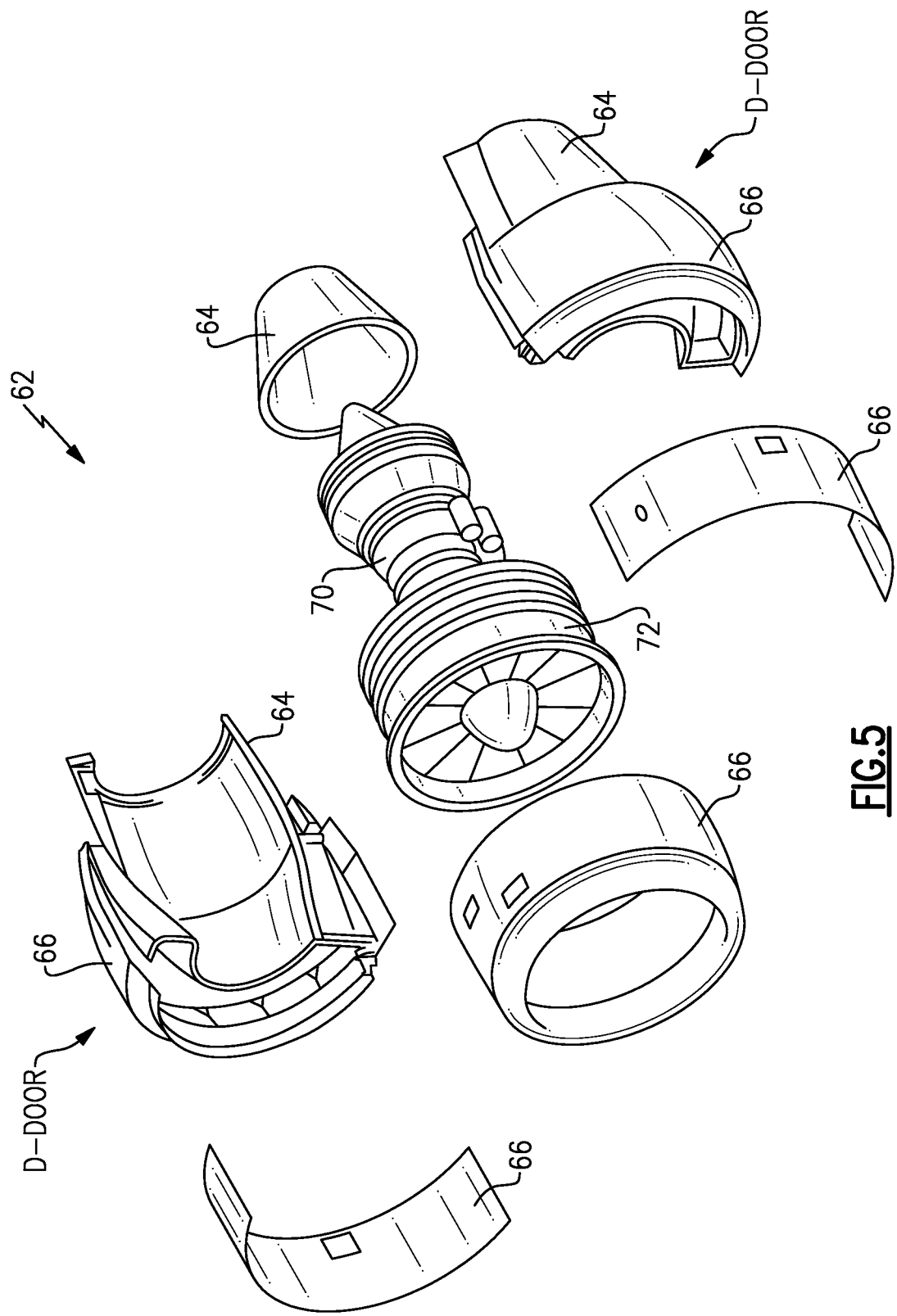
FIG. 5 is a perspective view of a duct arrangement with a scoop and a bypass flow duct within a core nacelle of the gas turbine engine.

Fan bypass air from a scoop 94 within the bypass flow path 74 is selectively communicated to the TMS pump 86 and the ECS pump 90 through a bypass flow duct 96 within the core nacelle 64 (FIG. 2). The scoop 94 and bypass flow duct 96 in the disclosed non-limiting embodiment may be mounted to the core case 70 (FIG. 5) independent of the core nacelle 64 such that the core nacelle 64 is readily opened and closed with respect to the core case 70 without the heretofore necessity of a seal structure which may be relatively heavy in weight. That is, the scoop 94 and the bypass flow duct 96 are independent of the core nacelle 64 section commonly referred to as D-doors.

Relatively hot bleed air sourced from the low pressure compressor 44 is also selectively communicated to the TMS pump 86 as well as the ECS pump 90 through a compressor flow duct 98. The compressor flow duct 98 communicates bleed air from the low pressure compressor 44. It should be appreciated that various duct and valve arrangements as may be utilized to tap the core case 70 to communicate bleed air from a multiple of circumferential locations around the low pressure compressor 44 for communication into the compressor flow duct 98.

Figure 6:
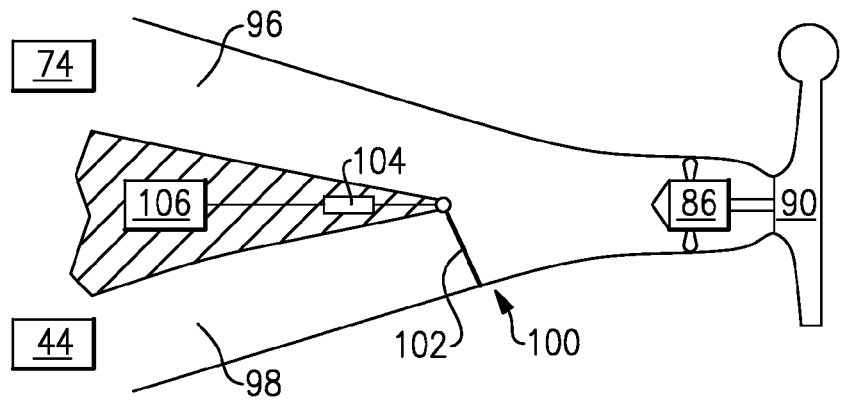
FIG. 6 is a schematic view of the duct arrangement in bypass flow position.
Figure 7:
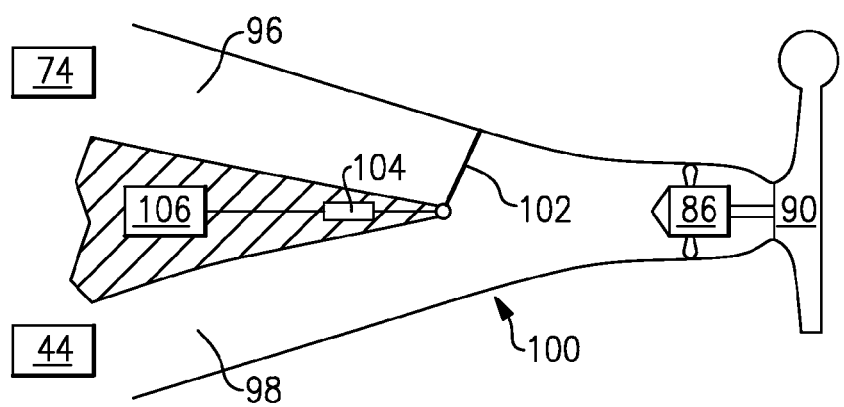
FIG. 7 is a schematic view of the duct arrangement in a bleed flow position.

The bypass flow duct 96 meets with the compressor flow duct 98 at an intersection 100. A valve 102 is located within the intersection 100 to selectively communicate either fan bypass flow from the bypass flow duct 96 (FIG. 6) or bleed flow from the compressor flow duct 98 (FIG. 7) to the TMS pump 86 and the ECS pump 90. That is, the valve 102 is movable between a first position (FIG. 6) and a second position (FIG. 7) to selectively communicate either fan bypass flow or bleed flow.

Figure 8:
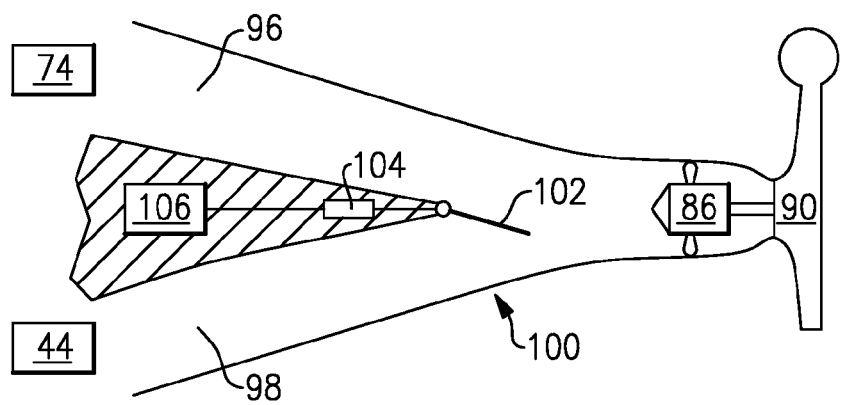
FIG. 8 is a schematic view of the duct arrangement in an intermediate position.

The valve 102 may be operated by an actuator 104 in response to a controller 106, such as a FADEC, to selectively communicate, for example, compressor bleed flow from the compressor flow duct 98 (FIG. 7) during an idle condition when fan bypass flow from the bypass flow duct 96 may not provide sufficient mass flow. It should be understood that various other conditions may be utilized to control the valve 102 which may alternatively or additionally be operated in a variable manner to provide a combined flow of fan bypass flow from the bypass flow duct 96 and bleed flow from the compressor flow duct 98 (FIG. 8). In other words, the valve 102 may be infinitely variable between the first position (FIG. 6) and the second position (FIG. 7) to provide a desired percentage of each.

In one disclosed, non-limiting embodiment, the ECS pump 90 may be a centrifugal pump and the TMS pump 86 may be an axial pump. The TMS pump 86 generates, for example, an approximately 1.1:1-1.8:1, and preferably 1.4:1, pressure ratio from the relatively low pressure ratio fan bypass flow which is sufficient to provide the relatively coldest airflow into the AOC 88, which may be approximately 200 degrees F. The relatively low pressure ratio fan bypass flow from the bypass flow path 74 is also provided to the ECS pump 90 to elevate the pressure thereof to, for example, an approximately 2:1-6:1, and preferably 4:1, pressure ratio at ground idle condition. The pressure increase provided by the ECS pump 90 also inherently increases temperature of the approximately 200 degrees F. fan bypass flow to less than 600 degrees F. for communication into the air-air precooler (PC) 92.

The downstream flow from the air-oil cooler (AOC) 88, which may be approximately 300 degrees F., is communicated into the air-air precooler 92. Discharge from the air-air precooler 92, which may be less than approximately 600 degrees F., is then ejected into the annular bypass flow path 74 to provide thrust recovery. That is, the relatively lower temperature air flow downstream of the ECS pump 90, which is typically less than approximately 600 degrees F., is passed through the air-air precooler 92 and is cooled to approximately 400 degrees F. for use as aircraft air system ECS air while the relatively higher temperature air discharged from air-air precooler 92, which may be less than approximately 600 degrees F., is ejected into the annular bypass flow path 74 to provide thrust recovery. An efficient and compact thermal system 80 is thereby provided.

The downstream flow from the air-air precooler 92 may also be utilized to provide pressurized cooling air for a hot bearing compartment for one or more of the bearing systems 38. Such components are typically toward an aft section of the engine 20 such as the #4 or #4/5 bearing compartments (illustrated schematically). The fan bypass flow is pumped to sufficient pressure (typically approximately 50 psi) and passed through the aircraft precooler 92 to reduce temperature sufficiently (typically to less than 450 F.) to be used directly as the bearing compartment cooling air. The precooler 92 thereby provides sufficiently low temperature air, instead of a dedicated buffer cooler, which may suffer from low inlet driving pressure at off-design conditions.

The TMS pump 86 and the ECS pump 90 are driven through a constant speed transmission 110. The constant speed transmission 110 is driven by a towershaft 124 geared to the low spool 30. The speed of the towershaft 124 varies linearly with the speed of the low spool 30 which may operate at speed excursions of up to 80% between idle to max take-off conditions. The constant speed transmission 110 maintains constant output speed despite speed excursions of the low spool 30. That is, the constant speed transmission 110 provides, for example, a 5:1 continuously variable gear ratio capability which automatically selects the most optimum gear ratio to maintain the constant output speed in response to the low spool 30 speed excursions.

Figure 9:
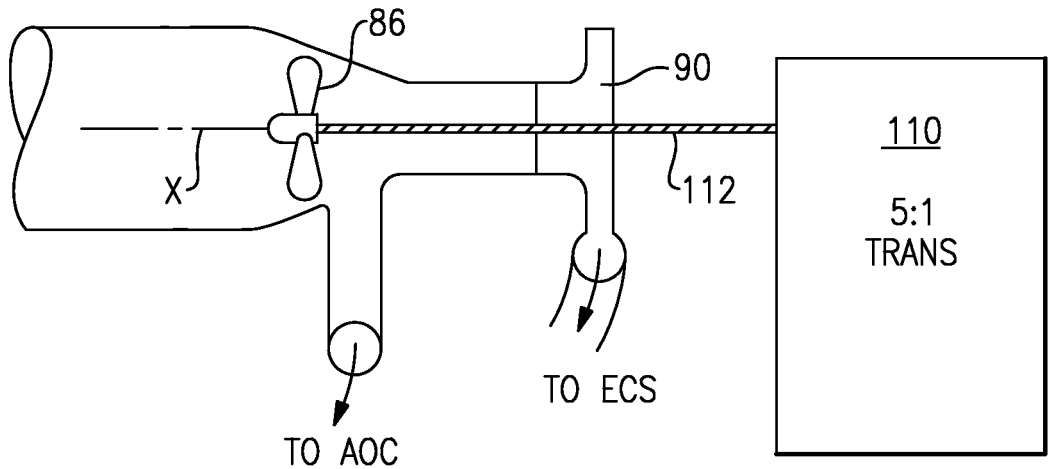
FIG. 9 is a schematic view of one disclosed non-limiting embodiment of a constant speed transmission which drives an ECS pump and a TMS pump in a serial arrangement.

With reference to FIG. 9, in one disclosed non-limiting embodiment, the TMS pump 86 and the ECS pump 90 are driven through the constant speed transmission 110 with a single axial drive shaft 112. That is, the TMS pump 86 and the ECS pump 90 are driven at the same rotational speed along a common axis X by shaft 112.

Figure 10:
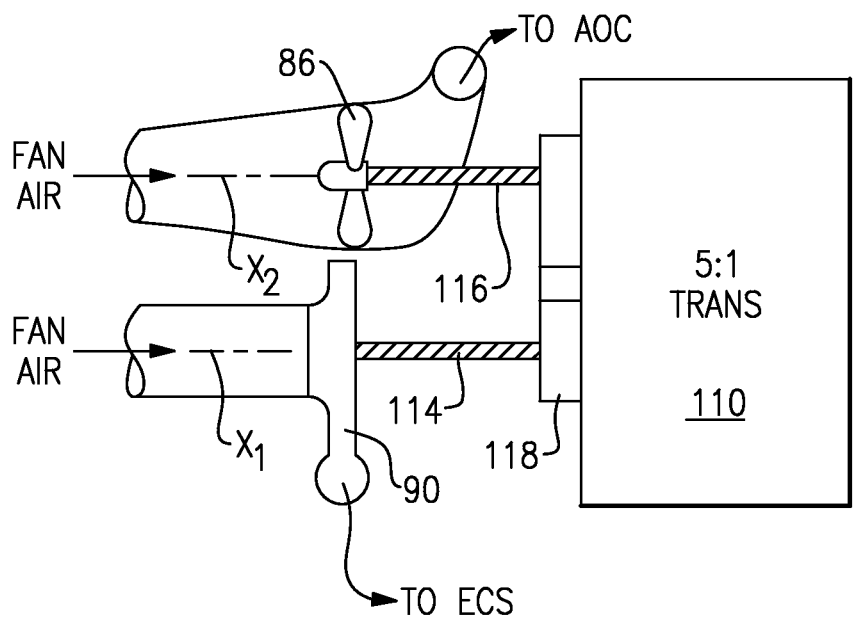
FIG. 10 is a schematic view of another disclosed non-limiting embodiment of a constant speed transmission which drives an ECS pump and a TMS pump in a parallel arrangement.

With reference to FIG. 10, in another disclosed non-limiting embodiment, the TMS pump 86 and the ECS pump 90 are driven through the constant speed transmission 110 through separate drive shafts 114, 116 respectively. That is, the drive shafts 114, 116 are parallel and rotate about their own respective axis X1, X2.

The parallel architecture facilitates direct drive of the drive shaft 114 by the constant speed transmission 110 while drive shaft 116 is driven by drive shaft 114 through a gearbox 118 or vice-versa. Gearbox 118 may be a direct, step-down or step-up gearbox such that shaft 116 is driven at the same rotational speed as shaft 114 or at a respective speed ratio with respect to shaft 114. In other words, the constant speed transmission 110 provides a constant output speed for shafts 114, 116 irrespective of low spool 30 speed excursions, and gearbox 118 provides a desired constant speed ratio between shafts 114 and 116.

Utilization of the constant-speed TMS pump 86 to drive air-oil cooler (AOC) 88 air flow increases the available pressure ratio for oil cooling. Power extraction from the relatively high-inertia low spool 30 also affects engine performance less adversely than does power extraction of a similar magnitude from the high spool 32.

Figure 11:
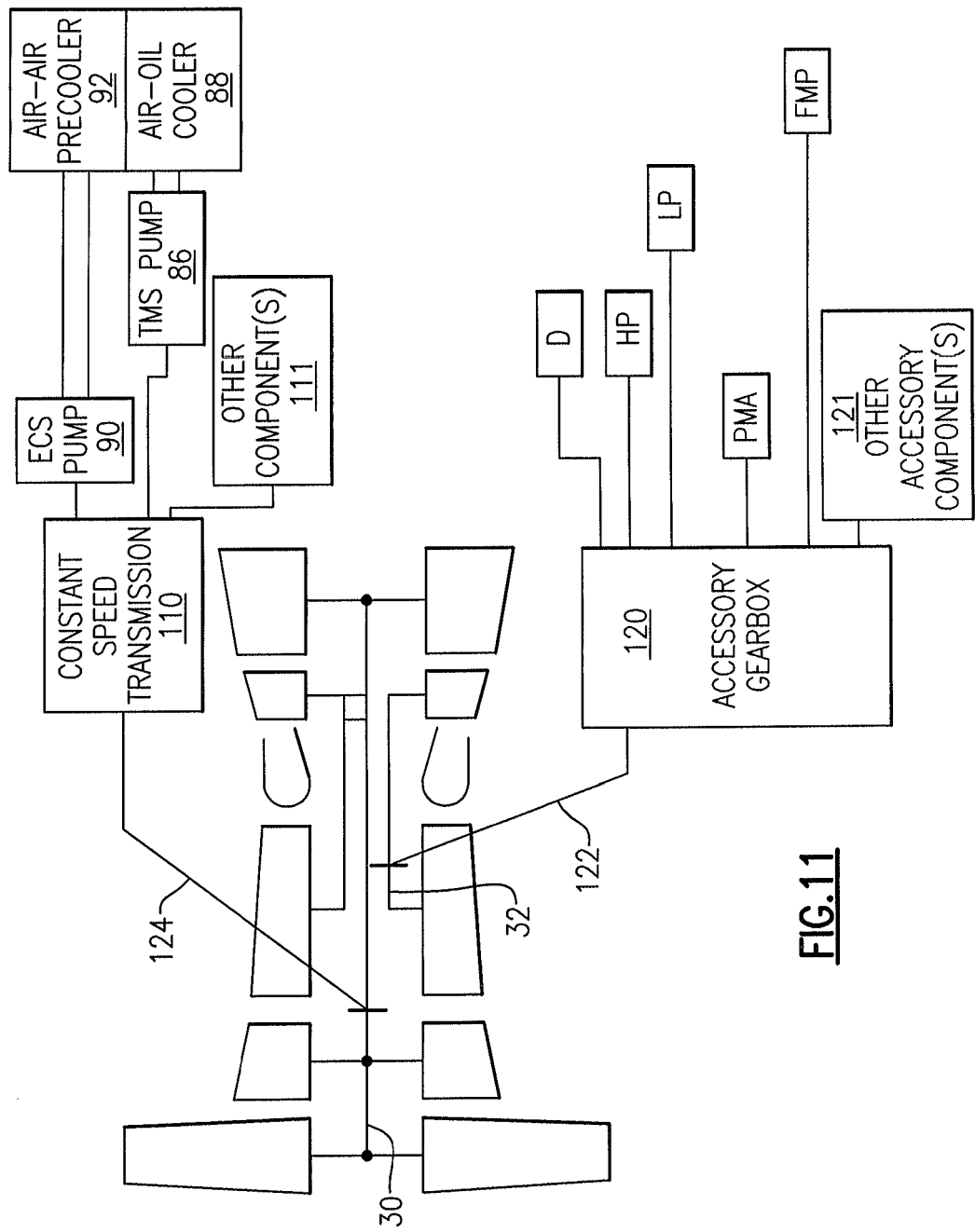
FIG. 11 is a schematic view of an accessory and thermal system driven by the gas turbine engine.

With reference to FIG. 11, the high spool 32 may still be utilized to drive a relatively conventional accessory gearbox 120 to power a multiple of accessory components such as, for example, a deoiler (D), a hydraulic pump (HP), a lube pump (LP), a permanent magnet alternator (PMA), a fuel pump module (FMP), and other accessory components 121 that may alternatively or additionally be provided.

A high towershaft 122 is geared to the high spool 32 to drive the accessory gearbox 120 at a speed that varies linearly with the speed of the high spool 32. The high spool 32 operates at speed excursions less than the low spool 30 and typically of only up to 30% between idle to max take-off conditions. Power extraction from the relatively low-inertia high spool 32 for operation of low demand accessory components minimally affects engine performance. That is, the thermal system 80 includes relatively high demand, high power systems which are more constantly operated to provide a desired speed/mass flow as compared to the accessory components driven by the high spool 32.

Utilization of the low spool 30 driven thermal system 80 increases operating range and decrease packaging volume. Integration of the, air-air precooler 92 into the common cooling/exit stream of the Air-Oil Cooler (AOC) 88 provides thrust recovery of the air-air precooler 92 discharge as compared to legacy configurations that dump precooler discharge flow overboard outside the fan bypass duct typically through the pylon fairing "thumbnail" or similar aircraft surface exposed to free stream air which negates thrust recovery benefits.

The dedicated ECS subsystem relieves the high spool 32 from inefficiencies and distortion due to bleeds at design and off-design points. ECS mass flow is approximately 1 lb per second, and efficiency gains from not bleeding this air from the high pressure compressor are about +2% HPC efficiency if power is instead extracted from the low spool, with reduced distortion due to lack of environmental control system bleeds. Exhaust gas temperature (EGT) at idle may also decrease by more than 230 degrees F. Overall system weight also decreases due to the reduced ducting. Accordingly, valuable externals packaging space is facilitated by the reduction and integration of the TMS and ECS. Further, mechanical complexity is reduced to increase reliability as well as reduce cost and maintenance requirements.

Figure 12:
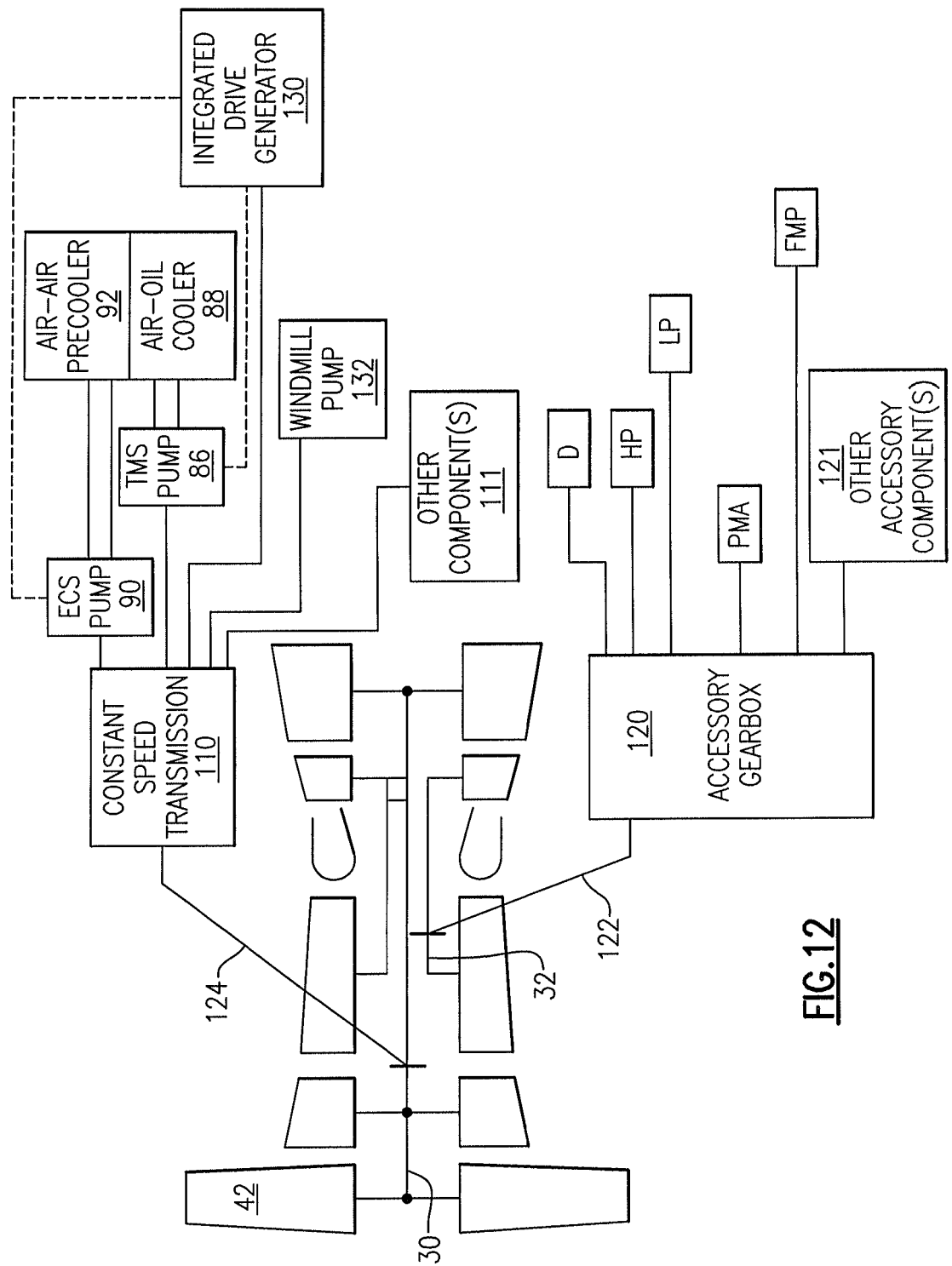
FIG. 12 is a schematic view of another disclosed non-limiting embodiment of a constant speed transmission which drives an IDG, a windmill pump, an ECS pump and a TMS pump.

With reference to FIG. 12, another disclosed non-limiting embodiment connects an integrated drive generator (IDG) 130 and a windmill pump 132 to the constant speed transmission 110. It should be appreciated that additional or alternative components and systems 111 (shown schematically in FIGS. 11 and 12) may be driven by the constant speed transmission 110. As the constant speed transmission 110 is driven by the low spool 30, the constant speed transmission 110 is driven even under "windmilling" conditions.

Under on-power operation, the integrated drive generator (IDG), the TMS pump 86 and the ECS pump 90 draw, in one example, between 90 kVA and 200 kVA (96-214 hp).

In a "windmilling" condition, the TMS pump 86, the ECS pump 90, the (IDG) 130 and the windmill pump 132 still operate and such operation may be utilized to control and reduce the speed of the fan 42 to a desired "windmilling" speed. Such speed reduction is achieved even in the unlikely presence of an imbalance while "windmilling" after fan blade liberation.

Applicant has determined through simulation that in one example geared architecture gas turbine engine, upwards of 200 hp of power extraction is available at acceptable fan 42 speeds during "windmilling" conditions. The various components driven by the constant speed transmission 110 and gear ratios provide multiple variables to achieve a desired "windmilling" speed of the fan 42 as well as the desired power generation of the integrated drive generator (IDG) 130, provide desired operational conditions of the TMS pump 86, the ECS pump 90, and the windmill pump 132. That is, the low spool 30 driven systems draw a required amount of power from the low spool 32 to operate as a brake to slow the low spool 32 to acceptable levels.

The windmill pump 132 pumps a lubricant to, for example, the geared architecture 48 to assure proper lubrication for a relatively higher in-flight "windmilling" condition as well as the relatively lower ground "windmilling" speed In one disclosed, non-limiting embodiment, the windmill pump 132 is alternatively or additionally "piggybacked" to the TMS pump 86 and/or the ECS pump 90. Alternately, the windmill pump 132 is independently driven such as in the parallel arrangement described above (FIG. 10).

The windmill pump 132 pumps a lubricant to, for example, the geared architecture 48 to assure proper lubrication for an in-flight and ground "windmilling" condition. The windmill pump 132 further facilitates lubrication delivery for both the relatively higher in-flight "windmilling" condition as well as the relatively lower ground "windmilling" condition due to the geared relationship with the low spool 32. It should be understood that the windmill pump 132 may be selectively actuated or operated at constant speed throughout the mission cycle as opposed to varying with a speed of the geared architecture 48.

Losses at an Aerodynamic Design Point (ADP; Cruise flight) and non-windmill conditions are reduced. Windmill pump size and weight are decreased compared to a core engine embedded version. In addition, the windmill pump 132 is remote from the engine core to facilitate increased maintenance accessibility as compared to conventional windmill pumps which are otherwise "buried" deep within the engine.\

As the windmill pump 132 is driven by the low spool 30 through the constant speed transmission 110, the individual accessories are thereby insulated from the speed excursions of the low spool 30. For example, takeoff condition at 100% speed and an idle condition at 20% speed. So, the accessory components thereby experience a gear ratio advantage of 5:1 during normal operation. The windmill pump 132 is currently designed to work at low spool 30 speeds of just above "0" rpm to idle, and then covers the entire 80% speed excursion of the low spool 30. Since the windmill pump 132 is also driven through the constant speed transmission 110 the windmill pump 132 need only handle the speed excursion between "0" rpm and the idle speed condition. The remainder—idle to takeoff condition—is accounted for by the constant speed transmission 110. This facilities operation of a lubrication system with an optimized pump that handles narrow speed excursions, while being line replaceable.

The low spool 30 driven integrated drive generator (IDG) 130 further facilitates integral power generation under "windmilling" conditions such that a Ram Air Turbine (RAT) emergency power generation system may no longer be required. Removal of the RAT reduces overall aircraft weight and obviates RAT deployment structures and packaging.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a spool;
   a windmill pump driven by said spool through a constant speed transmission;
   a first pump driven by said spool;
   an air-oil cooler downstream of said first pump;
   a second pump driven by said spool; and
   an air-air precooler downstream of said second pump.

2. The gas turbine engine as recited in claim 1, wherein said constant speed transmission is driven by a towershaft geared to said spool.

3. The gas turbine engine as recited in claim 1, wherein said spool operates at speed excursions of up to 80% between a first condition and a second condition.

4. The gas turbine engine as recited in claim 3, wherein said first condition is an idle condition and said second condition is a takeoff condition.

5. The gas turbine engine as recited in claim 1, wherein said spool is a low spool.

6. The gas turbine engine as recited in claim 1, wherein said spool drives a fan through a geared architecture.

7. The gas turbine engine as recited in claim 1, wherein said first pump is an axial pump.

8. The gas turbine engine as recited in claim 1, wherein said second pump is a centrifugal pump.

9. The gas turbine engine as recited in claim 1, wherein said air-air precooler is downstream of said air-oil cooler.

10. The gas turbine engine as recited in claim 1, wherein said windmill pump communicates a lubricant to a geared architecture.

11. The gas turbine engine as recited in claim 1, wherein said spool is a low spool.

12. The gas turbine engine as recited in claim 1, wherein said spool drives a fan through a geared architecture.

13. A method of gas turbine engine operations during a "windmilling" condition comprising:
   driving a windmill pump with a spool during a "windmilling" condition;
   communicating a lubricant to a geared architecture with the windmill pump;
   driving a first pump by the spool with an air-oil cooler downstream of the first pump; and
   driving the windmill pump through a constant speed transmission.

14. The method as recited in claim 13, further comprising:
   driving the constant speed transmission with a towershaft geared to said spool.

15. The method as recited in claim 13, further comprising:
   driving a second pump by the spool, an air-air precooler downstream of the second pump.

16. The method as recited in claim 13, further comprising driving a fan with the spool through the geared architecture.

* * * * *